(No Model.)
A. L. GARFORD.
SAFETY BICYCLE.
No. 457,080. Patented Aug. 4, 1891.
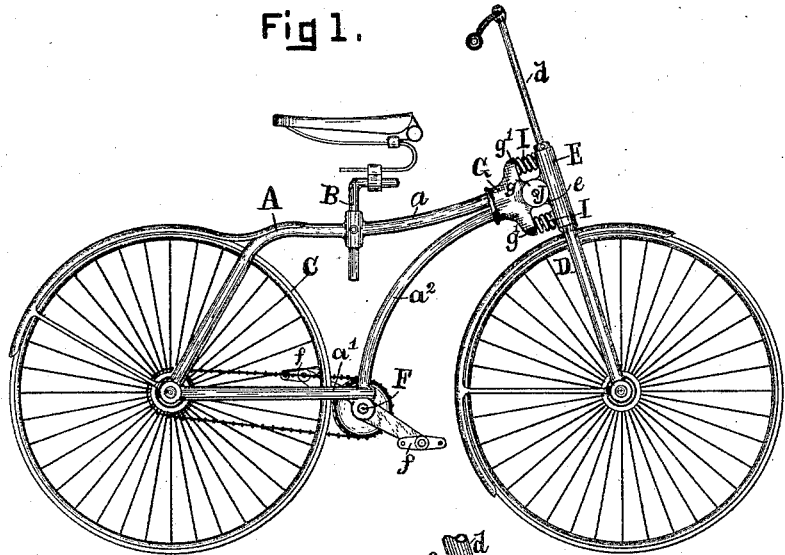
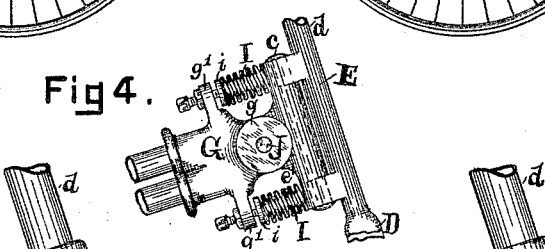
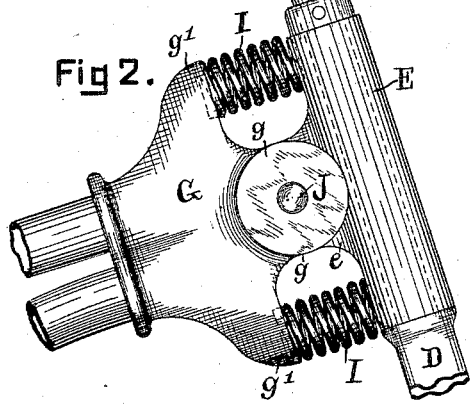 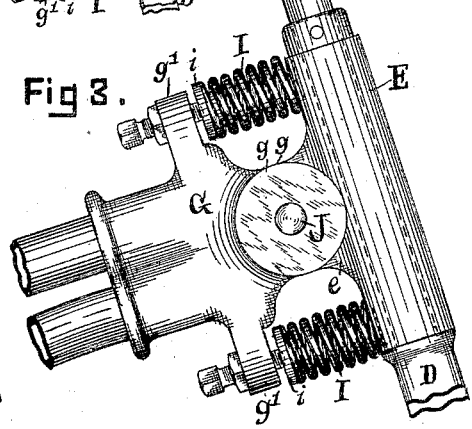
WITNESSES.
Frank Miller.
Albert H. Bates.
INVENTOR.
Arthur L. Garford
By his attorneys
Watson & Thurston

UNITED STATES PATENT OFFICE.

ARTHUR L. GARFORD, OF ELYRIA, OHIO.

SAFETY BICYCLE.

SPECIFICATION forming part of Letters Patent No. 457,080, dated August 4, 1891.

Application filed September 10, 1890. Serial No. 364,524. (No model.)

*To all whom it may concern:*

Be it known that I, ARTHUR L. GARFORD, a citizen of the United States, residing at Elyria, in the county of Lorain and State of Ohio, have invented certain new and useful Improvements in Safety Bicycles, of which the following is a full, clear, and exact description, reference being had to the accompanying drawings, in which—

Figure 1 is a side elevation of my improved bicycle, and Fig. 2 is an enlarged view of the forward end of the main frame and its connection with the sleeve which surrounds the steering-post. Fig. 3 is a similar view of the same part of the device in a modified form, and Fig. 4 is a similar view of the same part of the device in another modified form.

My invention relates to improvements in the construction of the frame of a Safety bicycle; and the object is to provide a construction in which the vibration and strain to which the frame is subjected when the machine is in use shall be greatly reduced and taken up, thereby increasing the durability of the machine and contributing to the comfort of the rider.

My invention consists, primarily, in the combination of a bicycle-frame, to which the rear wheel, the saddle, and propelling apparatus are suitably secured, with a sleeve or its equivalent, a horizontal pivot connecting said frame and sleeve, springs arranged to oppose the turning of said frame and sleeve upon said pivot in either direction, and the steering-post and front-wheel fork.

It also consists in the combinations and structural details hereinafter described, and pointed out definitely in the claims.

Referring to the parts by letters, A represents the main frame, which in the form shown consists of the backbone $a$ and the two arms $a'$ $a^2$, which are rigidly connected with the backbone and with each other by any suitable means. The saddle-support B is secured to the backbone. The shaft F, to which the pedals $f$ are attached, is journaled in said frame at or near the point where the arms $a'$ and $a^2$ are joined. The backbone and the arm $a'$ are bifurcated, and the rear wheel C is journaled to the frame at or about the point where the backbone and arm $a'$ are joined. The usual chain and sprocket wheels connect the shaft F with the rear wheel. The front wheel is mounted in the usual fork D, to which the steering-post $d$ is rigidly secured.

E represents a sleeve or its equivalent, which is pivotally connected with the steering-post. This piece E may be in the form of a sleeve, through which the steering-post passes and within which it is turned for the purpose of steering the machine, as shown in Figs. 1, 2, and 3; or the piece may be pivoted to the steering-post by the substantially vertical pin $c$, as shown in Fig. 4.

Attached rigidly to the forward end of the main frame is a head G, which is provided with two ears $g$ $g$ and with the two shoulders $g'$ $g'$. An ear $e$ on the sleeve E lies between the two ears $g$ $g$, and a horizontal pivot J, passing through said ears, pivotally connects ears, and thus pivotally connects the main frame A and sleeve E.

I I represent springs, one interposed between the upper shoulder $g'$ and the sleeve E and the other interposed between the lower shoulder $g'$ and the sleeve E. In the form shown these springs are coil-springs, and their ends rest in suitable sockets in the shoulders and sleeve, respectively, and these springs oppose any flection of the frame—that is to say, any turning of the parts upon their pivot J. They also act as buffers, which take up the vibration and jar incident to the working of the machine. In the form of the device shown in Fig. 3 a set-screw passes through each of the shoulders $g'$ $g'$ and bears against a cap $i$, which engages with the end of the spring. Thus by turning the screws in or out the springs I I may be more or less compressed, whereby the machine may be adjusted to suit riders of different weights.

Having thus described my invention, what I claim as new, and desire to secure by Letters Patent, is—

1. The combination of a main bicycle-frame, a head G, rigidly secured thereto, having the shoulders $g'$ $g'$, the sleeve E or its equivalent, a horizontal pivot connecting said sleeve and head intermediate of said shoulders, and a steering-post, with two expanding springs compressed between the shoulders $g'$ $g'$ and the sleeve E, one above and one below said pivot, substantially as and for the purpose specified.

2. The combination of a main bicycle-frame and a steering-post with a sleeve or its equivalent pivoted to the steering-post, said sleeve and frame being pivoted together by a horizontal pivot, whereby relative movement in a vertical plane is permissible, two springs arranged to oppose said movement, and adjustable devices adapted to separately regulate the tension of each spring, substantially as and for the purpose specified.

ARTHUR L. GARFORD.

Witnesses:
S. W. HENSON,
R. W. HILL.